United States Patent Office 2,991,324
Patented July 4, 1961

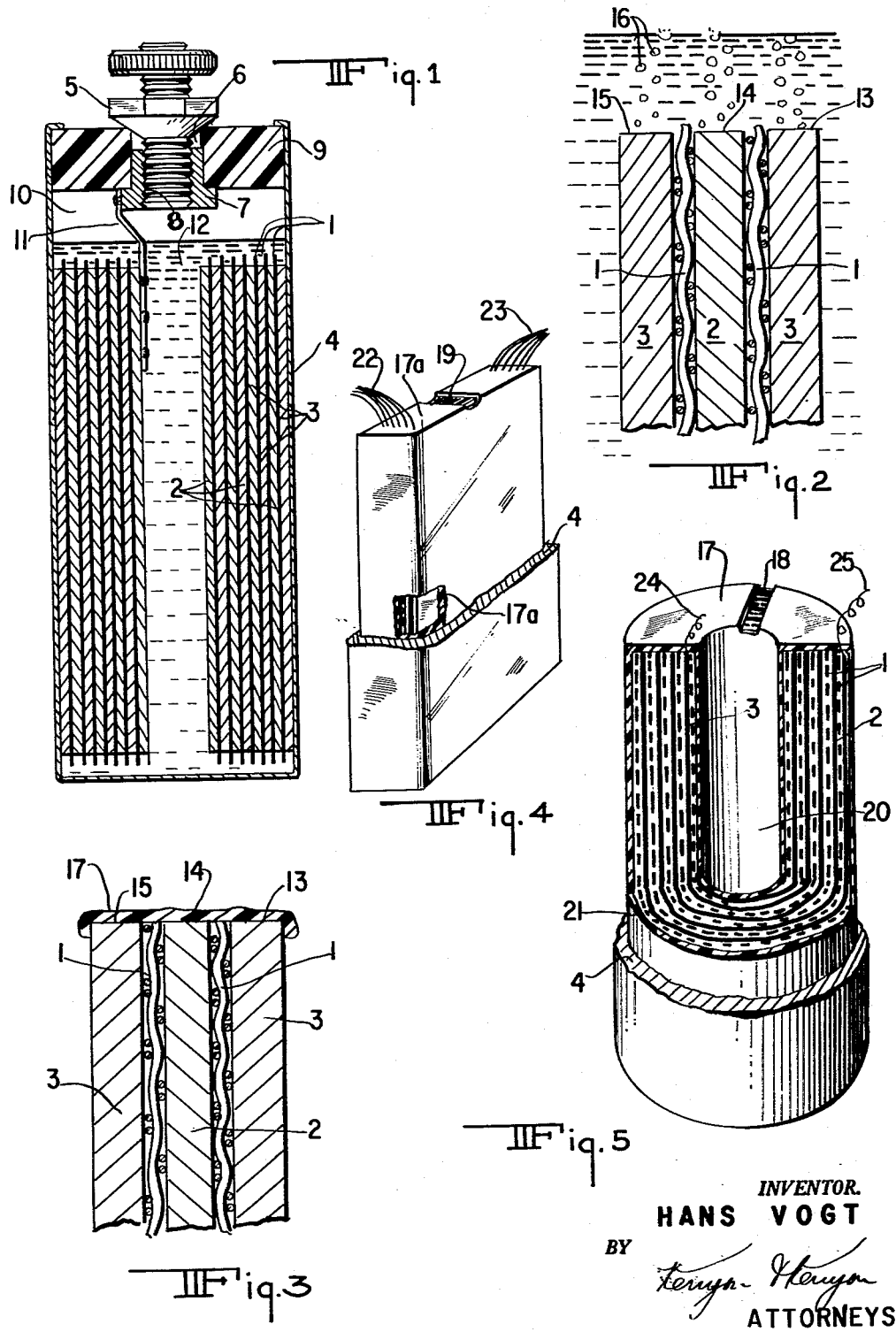

2,991,324
ALKALINE STORAGE BATTERY
Hans Vogt, Erlau, near Passau, Germany
Filed Mar. 18, 1954, Ser. No. 417,139
Claims priority, application Germany Mar. 21, 1953
4 Claims. (Cl. 136—13)

This invention relates to certain improvements in or relating to alkaline storage battery cells and has special reference to accumulators of the type in which the electrodes consist of thin porous sheets or foils of sintered metal powder.

It is an object of the present invention to provide an accumulator of the type referred to in which the elements of the accumulator are constructed and arranged in such a way that the development of gas in the accumulator can be kept under control so as to neutralize the detrimental effects of overcharging or overdischarging such accumulators.

A special object of the invention is to construct storage battery cells in such a way that they can be overcharged or overdischarged with the specified current intensity without an detrimental effects.

With these and other objects in view, this invention consists in the details of construction, combination of elements and operation hereinafter set forth and then specifically designated by the claims.

In order that those skilled in the art to which this invention appertains may understand how to make and use the same, I will describe its construction in detail, referring by numerals to the accompanying drawings forming part of this application, in which:

FIG. 1 is an axial section of one embodiment of an accumulator cell having the invention applied thereto, FIG. 2 is a sectional view illustrating certain physical phenomenons occurring in such accumulators, FIG. 3 is a sectional view showing a special feature of the present invention, FIG. 4 is a perspective view of a rectangular cell having the invention applied thereto, and FIG. 5 is a perspective view of a cylindrical cell, partly in section.

Similar reference numerals denote similar parts in the different views.

Referring now to the drawings in greater detail, and first to FIG. 1, it will be seen that an anode foil of sintered skeleton material 2, a cathode 3 of similar structure and an interposed separator 1 of a gas-permeable material, such as lye-resistant fabric, paper, or the like have been rolled or convolved into a coil which is inserted in a cylindrical casing 4 in such a way that tight mutual engagement of the surfaces of the superposed sheets is ensured in all operating conditions of the accumulator. The outer layer of the cathode 3 tightly engages the inner wall of the metallic casing 4, under pressure, so that the casing 4 forms one terminal of the cell, while the closure screw 5 is connected to the anode 2, by means of a conductor 11 which is soldered to the anode 2 and to a sleeve 7 which is threaded at 8 for engagement with the screw. An insulating member or cover 9, consisting, for instance, of the material known under the trade name of "Plexiglas" or the like is forced into the casing 4 with a bias and formed with a bore 6 whose bevelled upper edge is tightly engaged by the conical packing surface of the plug screw 5 under action of the pressure produced by tightening the screw 5 in the nut member 7, whereby the opening 6 serving for the filling-in of electrolyte is sealed against leakage of gas or electrolyte. The insulating cover 9 is held in the casing 4 by inward bending or flanging of the upper rim of the casing 4 so that it cannot be forced out of the casing even in case of considerable pressure in the casing.

The electrode coil before being inserted into the casing has been formed by repeated charging and discharging and has been completely discharged before its insertion in the casing. The hollow space within the casing 4 is filled with the electrolyte 12, preferably a potash lye KOH of a concentration of 20 to 25% so as to leave a pressure equalizing space 10 which favors the process of re-transformation of the gases. The lye is displaced by the gas bubbles from the narrow gaps between the electrodes into the space 10 whereby the gas bubbles between the electrodes can easily grow which is favorable for quick recombining of the gas into water as will be hereinafter described in greater detail. When the cell is closed before the cell is charged, by insertion of the threaded closure plug 5 and tightening same in the nut 7, at the completion of the charging both types of electrodes (anode and cathode) are completely charged and there is a stoichiometric ratio of the gases (hydrogen and oxygen) in the casing.

It has been found that in order to prevent the accumulation of excessive quantities of gas in, and consequent escape of gas from, the casing the following features must be properly harmonized:

(a) Space between the electrodes
(b) Coextensive shape and arrangement of the surfaces of adjacent electrodes of different polarity (symmetry)
(c) The separator must be permeable to gas and ions
(d) The current density per unit of electrode area must be properly limited in the charging process
(e) Provision of a proper gas and pressure equalizing space in the casing.

These various conditions will be hereinafter discussed in detail as follows:

(a) *Space between electrodes*

Generally speaking, the thickness of the electrode foils will be made less than 1 mm., and preferably 0.3 to 0.5 mm. The separator between electrodes of different polarity preferably is a highly porous fabric of glass, artificial, material, or lye-resistant fibres, e.g. of cellulose, and made so thin that it still provides a sufficient insulation between adjacent electrodes. Depending on the disruptive strength of the material, a thickness of a few hundredths of a millimeter up to some tenths of a millimeter, e.g., 0.1 to 0.2 mm., will be sufficient.

It is important that the space between the electrodes is made so small that the gas bubbles produced at the surfaces of the electrodes will bridge this distance immediately after their generation, quasi in statu nascendi, which can take place even in the atomic condition of the gas which is re-transformed into water. In other words, the resulting gas bubbles must get to the counter electrode on the shortest possible path, and without any particular obstacle, for being re-transformed into ions (0° into $OH^-$ ions and $H°$ into $H^+$ ions). In this connection, a certain overpressure in the casing is helpful, since it is thereby possible to attain a higher gas density in the gas bubbles determining the re-transformation effect as they are generated.

(b) *Coextensive shape and arrangement of adjacent electrodes*

The electrodes facing each other should be of the same size and configuration so as to coincide with each other and to avoid free active electrode surfaces which have no opposite. This is because the intended re-transformation of the gas occurs only in the narrow gap between adjacent active electrode surfaces. The gases formed on the electrode areas having no opposing surface of opposite polarity would not be recombined by this gap effect and therefore would give rise to the accumulation of gas in the casing and consequent impairment of the effect of re-transformation of the gas.

(c) Gas and ion permeability of the separator

The separator should permit the shortest possible path of gas communication between adjacent electrode surfaces. Accordingly it must be permeable to gas and consist of a highly porous or capillary material which may be in the form of a fabric or in the form of an insulating coating which is deposited on the electrodes. For instance, a fabric of synthetic resins such as those known as "Perlon" ("nylon") proved to be very suitable, or finely powdered diatom earth mixed with a solution of synthetic resin and applied on the active electrode surfaces. Other materials which are resistant to lyes and highly porous may be used as well.

(d) Formation of grids and electrodes

The current density per unit of electrode area must be kept as low as possible by providing a large active electrode surface obtainable by the provision of very thin and highly porous electrodes. To this end, the electrodes 2 and 3 have been produced by sintering metal powders, e.g. light nickel powder, iron powder, or mixtures of nickel and iron powder, or oxides thereof, from which they are obtained by reduction. A suspension of these powders, mixed with suitable pore-forming additions, such as carbon particles, ammonium carbonate particles or the like, may be applied to a carrier material, such as, a perforated metal foil of 0.02 mm. thickness, and sintered by being passed through sintering furnaces containing a reducing atmosphere, at a temperature of about 1000° C., whereby the powder particles are reduced, if necessary, and sintered together and to the carrier foil. Preferably, so-called "light" particles of a porous structure are used.

After the sintering the foils of the sintered skeleton structure are filled with suitable active substances, for instance, with the hydroxides of cadmium, of nickel, or of iron, by inserting salts of the desired metals into the pores of the skeleton structure and then precipitating them with an alkali.

(e) Gas space and pressure equalizing space in the casing

It will be understood that the development of gas bubbles on the electrode surface depends on the possibility of displacing the electrolyte surrounding the gas bubbles. Advantageously, therefore, the hermetically sealed casing is provided with a pressure equalizing chamber for the filling of the vessel, more particularly, for the electrolyte 12. To this end, preferably the accumulator vessel is only partly filled with electrolyte liquid or mass, so as to provide a pressure equalization space in the vessel, as shown at 10 in Fig. 1. The medium in this space is compressible and the gas bubbles forming at the surfaces of the electrodes can easily displace the electrolyte into this equalizing space. It will be understood that the space 10, instead of being filled up with gas or air, may also be formed by elastic members of the casing or by elastic materials provided in the casing, e.g. pads of cellular rubber which act as an elastic pressure equalizing chamber.

The dimensions and other data of a cell which has been carried out according to the principles of the present invention, by way of example, were as follows: The casing 4 (FIG. 1) had a length of 50 mms. and a diameter of 14 mms. Its measured total weight was 21 g., its capacity 0.5 to 0.8 amp.-hr., its charging voltage 1.4–1.5 volts, its discharging voltage 1.2 volts. The internal resistance was 0.09 to 0.12 ohm. At a reduction of the voltage of about 10 percent a discharging current of 5 to 7 amps. was measured. The charging efficiency in amp.-hr. in case of a charging of 50 percent is 98 percent (ampere-hour efficiency) and expressed in watt-hours 92 percent (watt-hour efficiency). When a boosting charge of 0.1 to 1.6 amperes was impressed upon this sealed cell having a storage capacity of 0.5 to 0.8 ampere-hour, a state of equilibrium was established at this charging current when the pressure within the cell rose to approximately 10 atmospheres. In case of smaller overcharging currents the internal pressure in the casing can be kept lower for attaining the intended equilibrium of pressure and current, whereas in case of higher over-charging currents the internal pressure in the casing (pressure-current balance) will be higher. On disconnection of the overcharging current the internal pressure in the casing owing to catalysis falls to zero within a certain time, e.g. 10 to 20 hours. In order to ensure the required safety of operation a steel sleeve with a wall thickness of 0.3 mm. was used for the casing, which sleeve is unbreakable up to a pressure of 150 atmospheres gauge pressure. The self-discharge or running down of the small cell of this embodiment was found to be about 20 to 22 percent of the original capacity after 2 months. The reduction of the capacity at temperatures of minus 25° C. is about 25 percent.

However, a storage battery cell as hereinbefore described if overcharged or overdischarged still will develop gas at the end edges of the plates or electrodes and at the outer faces of the outermost electrodes which are not faced by an opposite electrode of different polarity.

This is illustrated in FIG. 2. At a normal rate of charge, i.e. a normal charging current, no visible development of gas will occur in the accumulator vessel owing to the above mentioned constructional features, if the optimum electrode distance of, say, 0.05–0.15 mm. is maintained by separators 1 of a corresponding small thickness having a liquid absorbing property. However, the end surfaces or edges 13, 14, 15 are also within the electrolyte which acts as a conductor for ions, and in case of overcharging of the accumulator an exchange of ions will take place at these points also, causing the production of detrimental gas bubbles 16 which may form dangerous high pressure gas in the hermetically sealed vessel, owing to the fact that the conditions for recombining of the gas bubbles by cooperation with closely adjacent active electrode surfaces of opposite polarity are not existing at these edges.

In order to eliminate this source of gas bubbles I neutralize all those electrode surfaces which are not in a condition for immediate re-transformation of the gas bubbles. To this end, I cover all such surfaces with a fluidtight insulating layer 17, FIG. 3, preventing the exchange of ions at these surfaces. Said insulating layer advantageously consists of a lye-resistant cold-hardenable cast resin or an artificial resin applied in a thermoplastic condition by an injection-moulding or spraying process. As will be seen from FIG. 3 which shows only the top edges of the electrodes, the coating 17 also extends across the interstices between the electrodes, thus forming a gastight closure for the ends of the electrode pack which closure is fixedly connected with the electrodes but in general will not serve to stabilize the electrode pack mechanically. As will be described later, the continuity of the sealing coating 17 may be interrupted at one end of the electrode assembly for the entrance of the electrolyte to the separators and the spaces between the electrodes.

FIG. 4 shows a storage battery cell with an electrode pack or packet consisting of a multitude of parallelly arranged plates of alternating polarity and enclosed in a rectangular casing 4a which is broken off to display the pack which is provided with an allround coating 17a of synthetic material. The coating 17 on the top side of the pack is traversed by the electrode connections 22 and 23, which are tightly sealed in the coating while the latter is interrupted at 19 for permitting communication between the space between adjacent electrodes and the space (10 in FIG. 1) between the pack and the surrounding vessel 4a, whose upper part may be constructed in the same way as shown in FIG. 1. Through the interruption or gap 19 the separators can be soaked with the electrolyte and in case of a change of pressure between the space within the outer vessel (4a) and the interstices between the electrodes an exchange of electrolyte can take place through the gap 19 in the gastightly closed electrode package. Also any gases possibly produced in case of overcharging or overdischarging of the cell are permitted to flow out into the gas collecting or expansion space 10 (FIG. 1) for raising the gas pressure and facilitating the catalytic retransformation of the gas.

A wound electrode coil inserted in a cylindrical casing 4 is shown in FIG. 5. The casing 4 again is broken off to display the interior of the cell. In this case the parallel foils 2 and 3 of porous sintered metal powder material indicated by the dotted lines are wound up on a hollow core 20 which may consist of a synthetic material which is impermeable for gas and liquid, with a separating layer 1 of a thickness of about 0.1 mm. being inserted between the electrodes 2 and 3. The separator 1 is indicated by the solid lines. Again the end faces of the electrode coil are coated with a layer of synthetic material 17 and the outer periphery of the electrode coil is coated with a layer 21 of a similar synthetic material, in such a way that a tight connection is formed between the layers 20, 17, and 21. The electrode coil thus is completely enclosed except for a gap 18 having the same purpose as the gap 19 in FIG. 4. The upper part of the casing 4 may be constructed in the same way as shown in FIG. 1. The connecting wires are shown at 24 and 25.

The casing of the accumulator may be of any shape, type, and size according to the actual requirements, but it will be understood that a construction with a round cross section of the casing is to be preferred with a view to the relatively high pressure occurring in the casing.

According to a further very important feature of the present invention it is preferred to provide a cell which has no free gas space 10 above the electrodes at all, but whose gas space (which is required in order to permit development of the gas bubbles between the electrodes) is limited to the total space occupied by the very large number of very small individual gas bubbles developed and situated between the adjacent active electrode surfaces. It has been found, that a cell of this kind is much more efficient and especially operates without, or with a very small, increase of pressure in case of overcharging or overdischarging currents, owing to the fact that no gas can escape into a coherent gas space above the electrolyte where it would not be in a condition for immediate re-transformation.

This ideal state of the accumulator is preferably obtained in such a way that the casing with the fully charged complete electrode pack or coil inserted therein is evacuated and then completely filled with the electrolyte so that no empty space (or elastic pad) is left outside i.e. above the electrolyte pack. In other words, the cell is vacuum-filled and completely filled with the electrolyte. Then the cell is further charged in open condition, i.e. overcharged with the critical maximum charging current. Hereby, a certain amount of electrolyte is forced out of the open cell owing to the formation of gas bubbles between the electrodes. This overcharging process is continued until a predetermined amount of electrolyte has been displaced from the cell. This critical amount is experimentally determined for each type of cell beforehand by tests, with a view to reaching the state of the cell in which the pressure in the cell will not exceed a predetermined critical amount if the cell is overcharged during operation with the specified maximum charging current. Usually, with cells of an electrode thickness of about 0.5 mm. and a separator layer of 0.1 mm. consisting of polyamide fabric this percentage of electrolyte to be displaced was found to amount from 10 to 15% of the total volume of the electrode pack or coil including separator layers accommodated in the cell. When this quantity of electrolyte has been displaced, the cell is hermetically closed and sealed and is now ready for operation. The free space within the cell is thus exactly that occupied by the gas bubbles which developed at the selected rate of overcharging.

Cells of this type are subject to only a very small overpressure in case of overcharging with reasonable charging currents. Therefore, rectangular cells which are the preferred form with a view to better compactness of the total batteries can be used from a standpoint of pressure resistance. It is important, however, that the flat electrodes are kept at their specified distance from each other. To this end, the electrodes are held under a gentle mechanical pressure acting upon the outermost electrode faces, for instance, by means of metal sheets provided with a multitude of resilient tongues or other projections and inserted between the electrode pack and the inner surface of the accumulator vessel.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. An alkaline storage battery cell comprising a pressure resistant vessel having a fill hole and a gas-tight closure therefor in order to establish a hermetically sealed space within said vessel, an electrode pack within said vessel and occupying less than the total internal volume thereof, said electrode pack comprising a plurality of peripherally aligned electrode plates alternating in polarity, said plates being essentially coextensive in area and being constituted from porous sintered material having a large electrode surface in relation to the electrode volume and being less than 1.0 mm. in thickness, lye resistant gas permeable separators having a thickness not exceeding 0.2 mm. disposed between adjacent electrode plates of different polarity, said electrode plates and separators being maintained in tightly pressed relation against each other, an electrolyte filling in said vessel, and a coating non-penetratable by said electrolyte applied in direct contact with and enclosing substantially the entire surface area of said pack, said coating being interrupted by a gap extending across the edges of all electrodes and separators in said pack to permit communication between the electrolyte located within said vessel and exteriorly of said electrode package and the electrolyte located within said electrode package.

2. An alkaline storage cell according to claim 1 wherein the vessel is rectangular and the electrode plates and separators are parallelly arranged and enclosed in said vessel.

3. An alkaline storage battery cell according to claim 1 wherein the electrode plates and separators are rolled into a coil and wherein said vessel is cylindrical.

4. An alkaline storage cell according to claim 1 wherein the said coating is an electrolyte resistant artificial resin.

References Cited in the file of this patent

UNITED STATES PATENTS

| | | |
|---|---|---|
| 2,131,592 | Lange et al. | Sept. 27, 1938 |
| 2,361,533 | Endress et al. | Oct. 31, 1944 |
| 2,544,112 | Schneider | Mar. 6, 1951 |
| 2,561,943 | Moulton et al. | July 24, 1951 |
| 2,594,710 | Andre | Apr. 29, 1952 |
| 2,642,469 | Gary | June 16, 1953 |
| 2,646,455 | Jeannin | July 21, 1953 |
| 2,651,669 | Neumann | Sept. 8, 1953 |
| 2,672,494 | Fleischer | Mar. 16, 1954 |
| 2,677,006 | Ameln | Apr. 27, 1954 |
| 2,708,212 | Koren et al. | May 10, 1955 |

FOREIGN PATENTS

| | | |
|---|---|---|
| 746 | Great Britain | 1889 |